United States Patent [19]

Hirosaki

[11] 4,423,518

[45] Dec. 27, 1983

[54] TIMING RECOVERY CIRCUIT

[75] Inventor: Botaro Hirosaki, Tokyo, Japan

[73] Assignee: Nippon Electric Co., Ltd., Tokyo, Japan

[21] Appl. No.: 379,408

[22] Filed: May 18, 1982

[30] Foreign Application Priority Data

May 19, 1981 [JP] Japan .................................. 56-74301
May 19, 1981 [JP] Japan .................................. 56-74302

[51] Int. Cl.³ ............................................ H04L 7/02
[52] U.S. Cl. ........................................ 375/20; 375/24; 375/97; 375/120; 307/269; 331/1 A
[58] Field of Search ..................... 375/24, 96, 97, 110, 375/119, 120, 20; 307/358, 359, 360, 262, 269; 329/109, 145; 328/110, 116, 135, 179; 331/1 A; 370/100, 114

[56] References Cited

U.S. PATENT DOCUMENTS 4,380,083  4/1983  Andersson et al. ................. 375/120

Primary Examiner—Robert L. Griffin
Assistant Examiner—Albert W. Watkins
Attorney, Agent, or Firm—Sughrue, Mion, Zinn, Macpeak and Seas

[57] ABSTRACT

A timing signal is generated from a received pulse-amplitude-modulated (PAM) signal by generating a delayed difference signal, multiplying the delayed difference signal by ±1 in accordance with a decision signal, averaging the multiplication output to control a voltage-controlled oscillator, and using the oscillator output to clock a sampler/comparator which compares the input signal to a predetermined threshold at time instants determined by the VCO output to generate the decision signal.

7 Claims, 11 Drawing Figures

TIMING RECOVERY CIRCUIT

BACKGROUND OF THE INVENTION

The present invention relates to a timing recovery circuit for a receiver for pulse amplitude-modulated (PAM) signals.

Reception of a PAM signal of L discrete amplitude levels (where L is an integer equal to or greater than 2) is generally performed through the sampling of the incoming PAM signal at a proper time (point) and the subsequent determination of the amplitude level of the sampled signal. In this case, the timing signal for the determinaion of the proper sampling time is usually obtained by a self-timing method for extracting the timing signal from a reception signal in some way or other. One of such self-timing methods already known is the nonlinear extraction technique. This technique performs the extraction of a timing signal by utilizing a line spectrum appearing at the clock frequency position when a reception PAM signal is subjected to a nonlinear operation, such as a squaring operation. For this purpose, a nonlinear circuit is needed together with a bandpass filter for passing the clock frequency and an amplitude limiting circuit for eliminating the level fluctuation of said spectrum. As a result, the timing recovery circuit resorting to this technique becomes complicated. Moreover, those circuits used tend to malfunction in the high frequency region, leading to the disadvantage that the extracted timing signal is liable to contain undesirable phase noise. For example, the timing recovery circuit outlined above is shown in FIG. 18 of a paper entitled "An Experimental 560 Mbits/s Repeater with Integrated Circuits" by Engel Roza and Peter W. Millenaar, published in the IEEE TRANSACTIONS ON COMMUNICATIONS, Vol. COM-25, No. 9, pages 995 to 1004, September 1977 (Reference 1).

Another known self-timing method is the maximum likelihood detection technique. With this technique, a reception PAM signal is differentiated to control a timing signal generator so that timing positions may be adjusted to coincide with the zero crossings of the differentiated waveforms. This technique, employing a voltage-controlled oscillator (VCO) in place of such a nonlinear circuit as mentioned above, enables the generation of timing signals of a constant amplitude free from undesirable phase noise. However, since a differentiating circuit and a sample hold circuit for holding each sampled value of the differentiated waveforms (or the polarity signal of the sampled value) are indispensable to the second technique, the whole circuit structure eventually becomes bulky and complicated (see FIG. 4 of a paper entitled "Carrier and Bit Synchronization in Data Communication-A Tutorial Review" by L. E. Franks, published in the IEEE TRANSACTIONS ON COMMUNICATIONS, Vol. COM-28, No. 8, Pages 1107 to 1121, August 1980 (Reference 2)). Furthermore, because the fluctuation of a reception signal adversely affects the differentiated waveforms by the use of this technique, waveform deterioration on the transmission line must be minimized. This consequently makes the transmission system expensive.

One object of the present invention, therefore, is to provide a significantly small-scale timing recovery circuit capable of withstanding the deteriorated reception waveforms and free from the above-mentioned disadvantages unavoidable with the prior art timing recovery circuits.

SUMMARY OF THE INVENTION

According to one aspect of the invention, there is provided a timing recovery circuit for a receiver for PAM signals, which is so structured as to control the frequency of a timing signal by the value of correlation between the one-clock delayed differential signal of a reception signal and an NRZ (non-return-to-zero) data sequence obtained as a result of the decision procedure as such by the use of said timing signal. By so controlling the phase of the timing signal as to make zero the integrated value of the delayed difference waveform taken out by a rectangular wave having duty cycle ratio of 100 percent, the influence of local deterioration of the reception waveform is smoothed and the timing signal can thereby be subjected to stable phase control.

BRIEF DESCRIPTION OF THE DRAWINGS

Other features and advantages of the invention will be made more apparent by the detailed description hereunder taken in conjunction with the accompanying drawings, wherein.

In the drawings, the same reference numerals represent the same structural elements.

DETAILED DESCRIPTION OF THE PREFERRED EMBODIMENTS

Figure 1:
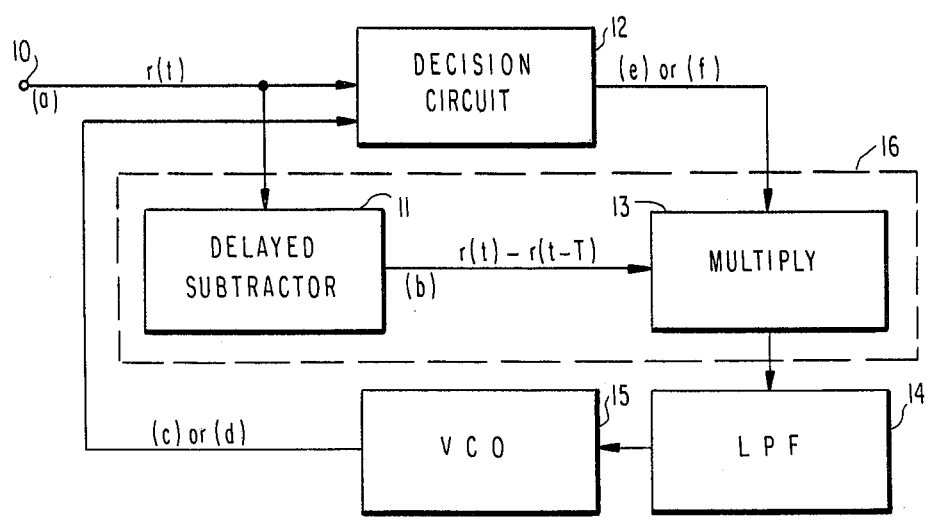
FIG. 1 is a block diagram of a first embodiment of the invention.

Now, referring to FIG. 1, a first embodiment is shown for use with PAM signals given in the form of binary sequences of ("+1" or "−1") or ("1" or "0").

This embodiment has an input terminal 10 to which a reception signal r(t) subjected to waveform equalization is fed; a delayed difference circuit 11 for subtracting from the signal r(t) a one-clock delayed signal r(t−T), which is T (T is the period of reference clock pulses) seconds behind r(t); a decision circuit 12; a multiplier 13 for analog-multiplying an NRZ data sequence, provided as the output of the circuit 12, by the output of the circuit 11; a low-pass filter 14; and a VCO 15. The output of the VCO 15 is a timing signal taking the form of clock pulses to provide the synchronization with the input signal r(t).

A reception PAM signal r(t), or a binary sequence having levels of "±1", received through the input terminal 10, is fed to the circuit 11 and the decision circuit 12. The circuit 11 produces as a difference signal the difference between the input signal r(t) and another input signal r(t−T) received one clock T prior to r(t). The circuit 12 determines the polarity of the difference between the input signal r(t) and a prescribed threshold level at each sampling time determined by each timing pulse received from the VCO 15. Thus, if the signal r(t) is greater than the threshold level at the sampling time, the circuit 12 will provide a logical "1" or, if the former is smaller than the latter, it will provide a logical "0". Through the analog multiplying operation, the multiplier 13 supplies the low-pass filter 14 with the difference signal provided by said circuit 11, passing the signal unchanged if the output of the circuit 12 is a "1"

or with the polarity of said difference signal inverted if the output of the decision circuit 12 is a logical "0". The output of the multiplier 13 is smoothed by the low-pass filter 14, and supplied as control voltage to control the oscillation frequency of the VCO 15 for determination of the decision timing of the decision circuit 12.

Next will be described the operation of this embodiment with reference to FIGS. 2(a) through (h) illustrating waveforms in different parts thereof. These waveforms correspond to those parts shown in FIG. 1 marked respectively with the same letters as the reference letters of the waveforms.

Figure 2:
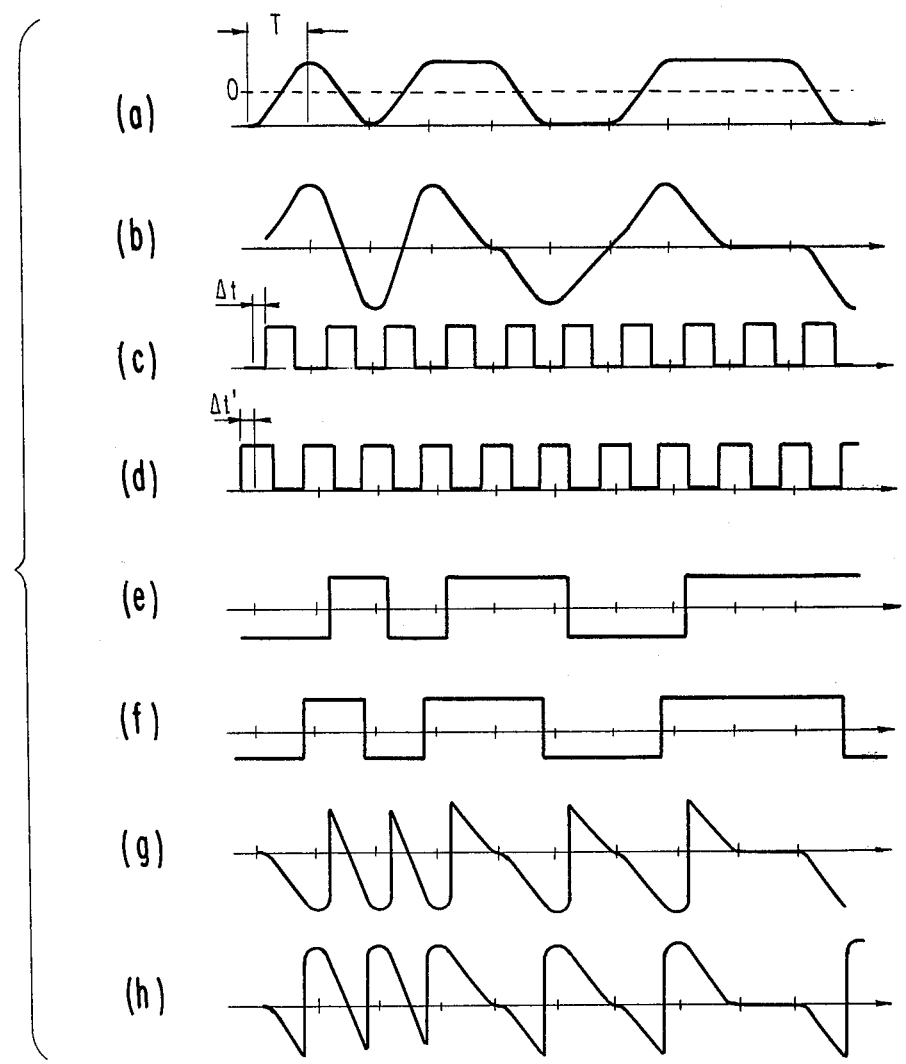
FIGS. 2(a) through (h) are diagrams of waveforms in various parts of the embodiment.

FIG. 2(a) shows the reception signal having levels of ±1, and FIG. 2(b), the output of the circuit 11. Now supposing that a timing pulse supplied from the VCO 15 is Δt behind a reference clock pulse (not shown) as shown in FIG. 2(c), and assuming that the threshold level of the decision circuit 12 is zero, the output of the circuit 12 will be like FIG. 2(e). Consequently the output of the circuit 11 multiplied by the output of the circuit 12 in the multiplier 13 becomes a waveform such as shown in FIG. 2(g). The mean value of this waveform takes a negative value. The VCO 15 is controlled by a waveform resulting from the averaging of the waveform of FIG. 2(g) by the low-pass filter and, if the averaged waveform is negative, will act to recover the phase delay by raising the frequency of oscillation. Conversely, if the timing pulse supplied from the VCO 15 is Δt'0 ahead of said reference clock pulse shown in FIG. 2(d), the output of the circuit 12 will have a waveform such as shown in FIG. 2(f) and, the output of the circuit 11 provided through the multiplier 13 becomes a waveform such as shown in FIG. 2(h). The mean value of this waveform takes a positive value. At this time, the VCO 15 will act to recover the phase advance, with its oscillating frequency lowered for control.

Figure 3:
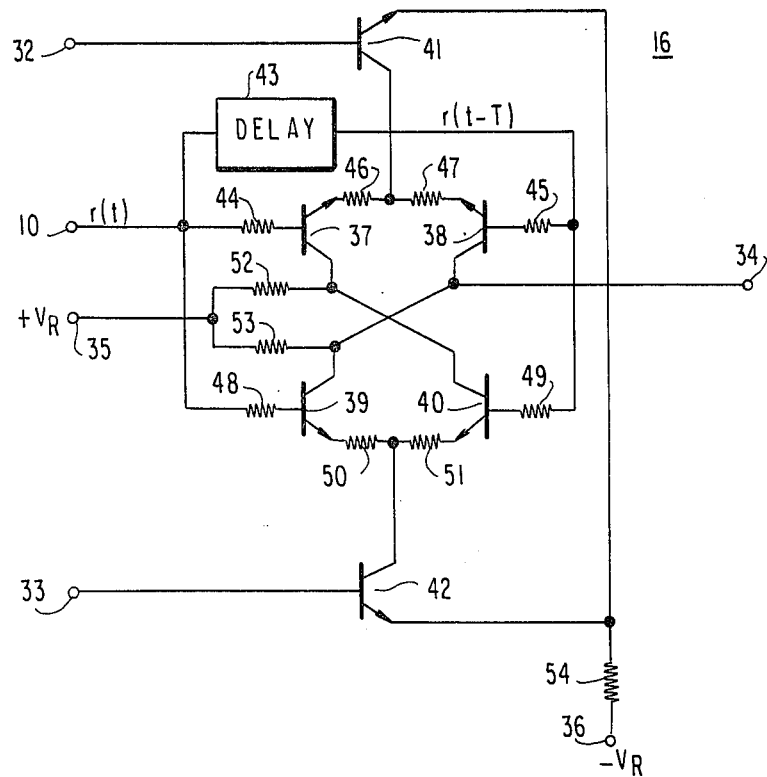
FIG. 3 is a circuit diagram of a part of the embodiment.

FIG. 3 shows the phase detecting circuit 16 formed by the integration of the circuit 11 and the multiplier 13.

Referring to FIG. 3, a reception PAM signal r(t) from the terminal 10 is provided to the base electrodes of transistors 37 and 39 through resistors 44 and 48. On the other hand, another signal r(t−T) delayed by one clock T by a delay circuit 43 formed of a one-clock delay line is provided by way of resistors 45 and 49 to the base electrodes of transistors 38 and 40. The emitter electrodes of the transistors 37 and 38 are connected through resistors 46 and 47 for gain adjustment, respectively, to the collector electrode of a transistor 41. The collector electrodes of the transistors 37 and 38 are connected via resistors 52 and 53, respectively, to a positive power supply terminal 35 connected to a positive-voltage power source $+V_R$. In this example, a first differential amplifier is composed of the transistors 37 and 38 and the resistors 44 to 47. Similarly, a second differential amplifier is made up primarily of the transistors 39 and 40 and resistors 48 to 51. The positive-polarity output terminal of said fist differential amplifier, i.e., the collector electrode of the transistor 38, and the negative-polarity output terminal of said second differential amplifier, i.e., the collector electrode of the transistor 39, are connected to each other, and so are the negative-polarity output terminal of said first differential amplifier (the collector electrode of the transistor 37) and the positive-polarity output terminal of said second differential amplifier (the collector electrode of the transistor 40). The emitter electrodes of the transistors 39 and 40 are connected by way of the resistors 50 and 51, respectively, to the collector electrode of a transistor 42. The emitter electrode of said transistor 41 and that of said transistor 42 are commonly connected by way of a resistor 54 to a negative-voltage power source terminal 36 connected to a negative-voltage power source $-V_R$.

As shown in FIG. 3, the part surrounded by the one-dot-dash line in FIG. 1 is integrated, and the output of the decision circuit 12 is supplied by way of the terminal 32 to the base electrode of the transistor 41. At this time, the base electrode of the transistor 42, i.e., a terminal 33, is fixed at zero volt.

In operation, with a logical "1" output received from the circuit 12 to provide $V_a$ volts ($V_a$ being greater than zero and equal to or smaller than $V_R$) at the terminal 32, the transistors 41 and 42 are turned on and off, respectively, because the base electrode of the transistor 42 is at zero volts. As a result, the amplifier (37, 38, 46, 47) produces a delayed differential signal {r(t)−r(t−T)} from the collector electrode of the transistor 38, whereas said amplifier (39, 40, 50, 51) does not operate at this time.

On the other hand, a logical "0" output from the circuit 12 causes the terminal 32 to be held at $-V_a$ volts. As a result, the transistors 42 and 41 are turned on and off, respectively, so that only the amplifier (39, 40, 50, 51) operates to produce an inverted version of said delayed differential signal at the collector electrode of the transistor 39. Therefore, from the output terminal 34 is supplied the result of analog multiplication of a delayed difference signal by a decision sequence, and it is supplied to the low-pass filter 14 referred to in FIG. 1.

The structure shown in FIG. 1 can also be applied to a binary sequence having levels of "0" and "1". In this case, the multiplier 13 and the circuit 12 function differently from those shown in FIG. 1. More specifically, the multiiplier 13 functions as a gate for passing a delayed difference signal from the circuit 11 only while the output of the decision circuit 12 is logical "1". The signal passed by said gate controls the oscillating frequency of the VCO 15 through the low-pass filter 14. Also, the decision circuit 12 decides whether a given input signal is larger than a threshold level 0.5. More clearly, in response to a logical "1" output from the circuit 12 to provide the terminal 32 with $V_a$ volts, the amplifier (37, 38, 46, 47) operates to produce a a delayed differential signal from the collector electrode of the transistor 38, because the base electrode of the transistor 42 is at zero volts. On the contrary, with a logical "0" output fed from the circuit 12 to provide zero volts for the terminal 32, both the amplifiers (37, 38, 46, 47) and (39, 40, 50, 51) operate to produce a zero volt output at the terminal 34.

Figure 4:
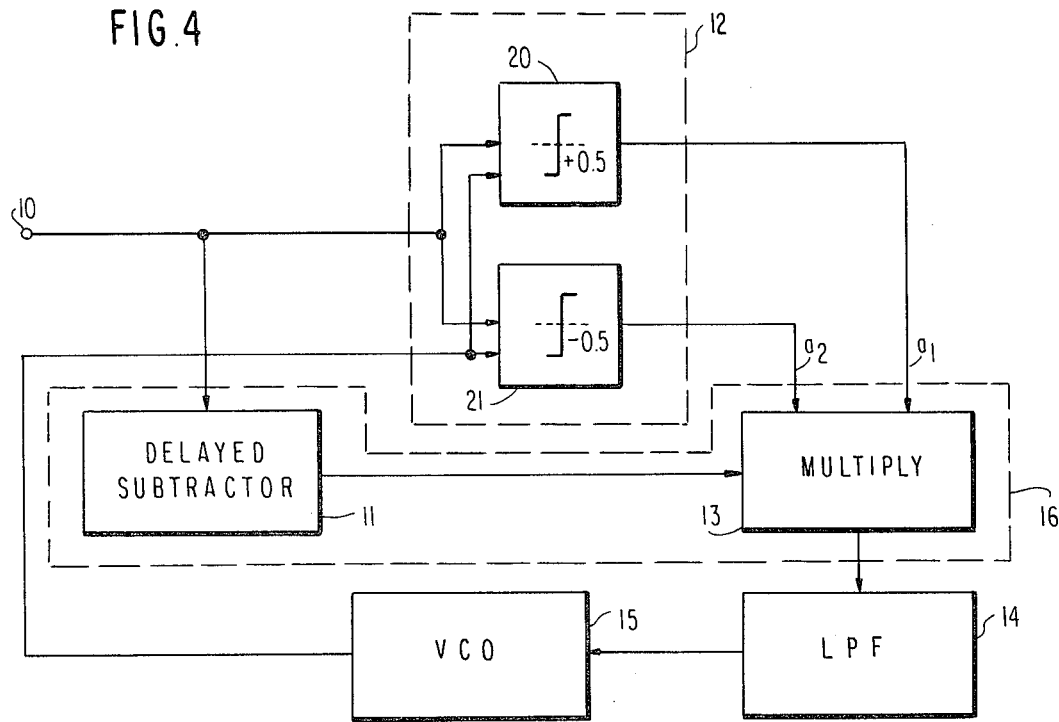
FIG. 4 is a block diagram of a second embodiment.

Referring now to FIG. 4, a second embodiment suited for a ternary sequence having levels of "0" and "±1" includes the decision circuit 12 consisting of a first decision circuit 20 for discriminating a reception signal with a threshold level ±0.5 and a second decision circuit 21 for discriminating the reception signal with a threshold level −0.5, and the multiplier 13.

In this embodiment, the reception signal is determined to be greater or smaller than the threshold levels ±0.5 and −0.5 by the first decision circuit 20 and the second decision circuit 21, respectively. These determinations are accomplished at the identical time prescribed by each timing pulse supplied from the VCO 15. Each of the circuits 20 and 21 will provide a logical "1" if the reception signal is found to be greater than its threshold level, or a logical "0" if it is found smaller.

Supposing that the logical outputs of the circuits 20 and 21 are represented here by $a_1$ and $a_2$, respectively, the circuit 13 will supply a delayed difference signal received from the circuit 11 to the low-pass filter 14 if the two-bit input ($a_1$, $a_2$) thereby obtained is (1, 1), or supply said delayed difference signal inverted to the filter 14 if ($a_1$, $a_2$) is (0, 0), and its output will be 0 in all other cases. In this embodiment, modifications should be made to the circuit 16 shown in FIG. 3 so that the output of the circuit 20 is supplied to the terminal 32 and an inverted version of the output of the circuit 21 is supplied to the terminal 33. More specifically, logical "1" outputs from the circuits 20 and 21 cause the terminals 32 and 33 to be held at $V_a$ and $-V_a$ volts, respectively. As a result, only the amplifier (37, 38, 46, 47) operates to produce a delayed differential signal 55 $r(t)-r(t-T)\}$ at the terminal 34, since $-V_a$ volts, or an inverted version of the output of the circuit 21, is given to the terminal 33. In contrast, logical "0" outputs fed from the circuits 20 and 21 cause the terminals 32 and 33 to be held at $-V_a$ and $V_a$ volts, respectively, so that the other amplifier (39, 40, 50, 51) produces an inverted version of $\{r(t)-(r(t-T)\}$ at the terminal 34. Further, where either logical outputs "1" and "0" or "0" and "1" are supplied from the circuits 20 and 21, a zero volt output is produced at the terminal 34.

As described above, the present timing recovery circuit, which is so structured as to detect the global positive-negative balance of a one-clock delayed difference signal and to control the frequency of the timing signal therewith, is not affected by the deterioration of reception waveforms. Thus, the present circuit can be useful even when the transmission performance is poor.

Each of the decision circuits 12, 20, and 21 used in the first and second embodiments may be composed of the type shown in FIG. 13 on page 999 of Reference 1.

As has been discussed above, the invention can dispense with the use of differential wave sample values, which are sensitive to phase distortion, for obtaining information on phase differences. This consequently enables the simplification of the entire structure as well as the suppression of performance deterioration owing to phase distortion of the system.

It will be readily understood that the above-mentioned embodiments suited for the reception PAM signals given by binary and ternary sequences may also be applied to those signals of multi-level sequences of more than three levels by regarding these sequences as being formed by superimposing noises on binary or ternary sequences.

The invention is suitable for use, for instance, with coaxial and optical PCM reception systems, which are required not to consume much electric power, and therefore will prove highly useful for practical purposes.

What is claimed is:

1. A timing recovery circuit for a receiver for receiving pulse amplitude-modulated (PAM) signals given in the form of binary sequences, comprising: delayed difference means for supplying the difference between a reception PAM signal and said reception signal delayed by one clock period; a voltage-controlled oscillator for generating a timing signal whose oscillating frequency is controlled in response to a control voltage; decision means for determining, at time instants determined by said timing signal supplied by said voltage-controlled oscillator, whether or not said reception signal is greater than a predetermined threshold level; and multiplier means for analog-multiplying the output of said decision means by the output of said delayed difference means, wherein the mean value of the output of said multiplier means is used as said control voltage.

2. A timing recovery circuit for a receiver for receiving pulse amplitude-modulated (PAM) signals given in the form of a ternary sequence, comprising: delayed difference means for supplying the difference between a reception PAM signal and said reception signal delayed by one clock period; a voltage-controlled oscillator for generating a timing signal whose oscillating frequency is controlled in response to a control voltage; first decision means for determining, at time instants determined by said timing signal, whether or not said reception signal is greater than a predetermined first threshold level; second decision means for determining, at said time instants, whether or not said reception signal is greater than a predetermined second threshold level; and multiplier means for analog-multiplying the outputs of said delayed difference means by the outputs of said first and second decision means, wherein the mean value of the output of said multiplier means is used as said control voltage.

3. A timing recovery circuit for a receiver for receiving pulse-amplitude-modulated (PAM) signals, said recovery circuit comprising: delayed difference means for generating a delayed difference signal corresponding to the differences between a received PAM signal and a delayed version of said received PAM signal; control means for generating a control signal from said delayed difference signal in accordance with a decision signal; timing signal generating means for generating a timing signal having a frequency determined in accordance with the average value of the output of said control means; and decision means for comparing said reception signal to a threshold level at time instants determined by said timing signal and generating said decision signal in accordance with said comparisons.

4. A timing recovery circuit as claimed in claim 3, wherein said timing signal generating means comprises a low pass filter for receiving said control means output and a voltage controlled oscillator controlled by the output of said filter.

5. A timing recovery circuit as claimed in claim 3, wherein said decision means compares said reception signal to at least two different threshold levels and provides at least two simultaneous bits of output as said decision signal with each bit indicating whether said reception signal is above or below a respective one of said threshold levels, said control means generating said control signal from said delayed difference signal in accordance with predetermined combinations of said decision signal bits.

6. A timing recovery circuit as claimed in any one of claims 3, 4 or 5, wherein said control means comprises a gate for blocking said delayed difference signal or passing said delayed difference signal without modification in accordance with said decision signal.

7. A timing recovery circuit as claimed in any one of claims 3, 4 or 5, wherein said control means comprises an analog multiplier.

* * * * *

UNITED STATES PATENT AND TRADEMARK OFFICE
CERTIFICATE OF CORRECTION

PATENT NO. : 4,423,518

DATED : December 27, 1983

INVENTOR(S) : BOTARO HIROSAKI

It is certified that error appears in the above-identified patent and that said Letters Patent is hereby corrected as shown below:

```
Column 2, line 15, after "having" insert --a--.
Column 3, line 19, after "Consequently" insert --,--;
          line 29, delete "0" before "ahead";
          line 57, "fist" should be --first--.
Column 4, line 36, "multiiplier should be --multiplier--;
          line 57, delete underscore under "±";
          line 62, change "+" to --+--.
Column 5, line 16, delete "55" and insert --{--;
          line 23, delete "(" after the first "-".
```

Signed and Sealed this

Fifteenth Day of May 1984

[SEAL]

Attest:

GERALD J. MOSSINGHOFF

Attesting Officer

Commissioner of Patents and Trademarks